United States Patent [19]
Deubel et al.

[11] 4,333,732
[45] Jun. 8, 1982

[54] DYESTUFF PREPARATIONS CONTAINING OXALKYLATES OF MODIFIED NATURAL ROSIN ACIDS

[75] Inventors: Reinhold Deubel, Bad Soden am Taunus; Konrad Opitz, Liederbach; Hubert Kruse, Kelkheim; Manfred Schneider, Eppstein; Heinz Uhrig, Steinbach, all of Fed. Rep. of Germany

[73] Assignee: Hoechst Aktiengesellschaft, Frankfurt am Main, Fed. Rep. of Germany

[21] Appl. No.: 75,032

[22] Filed: Sep. 13, 1979

[30] Foreign Application Priority Data

Jun. 16, 1979 [DE] Fed. Rep. of Germany ....... 2924404

[51] Int. Cl.³ .................. C09B 67/00; D06P 1/16
[52] U.S. Cl. ........................... 8/527; 8/552; 8/582; 8/922; 260/97.5; 260/104
[58] Field of Search ............ 8/93, 179, 527, 552, 8/582; 260/97.5, 104

[56] References Cited

U.S. PATENT DOCUMENTS

| 2,950,272 | 8/1960 | Kirkpatrick | 260/104 |
|---|---|---|---|
| 3,594,123 | 8/1967 | Encke et al. | 423/320 |
| 3,736,096 | 5/1973 | Nichols et al. | 8/93 |
| 3,923,457 | 12/1975 | Ong et al. | 8/93 |
| 3,957,432 | 5/1976 | Kuryla | 8/93 |
| 3,963,432 | 6/1976 | Hauxwell et al. | 8/93 |
| 3,977,828 | 8/1976 | Becker et al. | . |
| 4,042,320 | 8/1977 | Becker et al. | . |
| 4,094,634 | 6/1978 | Becker et al. | . |
| 4,115,457 | 9/1978 | Wiedemann | 8/93 |

FOREIGN PATENT DOCUMENTS 946189 5/1949 France .
1008635 5/1952 France .
1513160 6/1978 United Kingdom .

Primary Examiner—A. Lionel Clingman
Attorney, Agent, or Firm—Curtis, Morris & Safford

[57] ABSTRACT

Oxalkylates of chemically modified natural rosin acids are useful for dyestuff preparations, especially for dispersions of disperse dyestuffs. The liquid and solid dyestuff preparations containing these oxalkylates are stable to storing even with high dyestuff concentrations, easily redispersible while developing little foam and easily biodegradable.

15 Claims, No Drawings

DYESTUFF PREPARATIONS CONTAINING OXALKYLATES OF MODIFIED NATURAL ROSIN ACIDS

The present invention relates to dyestuff preparations containing oxalkylates of modified natural rosin acids.

The subject of the invention is the use of water-soluble products having been formed by the addition of ethylene oxide and/or propylene oxide to modified natural rosin acids, which products have the general formula (I)

$$A-[(X-O)_n-H]_m$$

in which

A stands for
- a. modified natural rosin acids obtained by disproportio-, nation, dimerization, hydrogenation, dehydrogenation or by a reaction of aromatic hydroxy compounds and/or aryl, aralkyl or cycloalkyl compounds capable of splitting off halogen with commercial types of colophony, or
- b. esterification products of 1 to 4, preferably 1 to 2, mols of natural rosin acids or of rosin acids modified according to (a) with 1 mol of a dihydric to hexahydric alcohol, or mixtures of these esterification products, or
- c. maleinate rosins obtained from commercial types of colophony by a reaction with maleic anhydride and subsequent esterification of the anhydride group, or
- d. hydroabietyl alcohol obtained by hydrogenation of abietic acid;

X stands for identical or different groups of the formulae —CH$_2$—CH$_2$— and —CH$_2$—CH(CH$_3$)— n stands for a number of from 8 to 100, and m stands for an integer of from 1 to 5, as preparation agents for dyestuffs, as well as the corresponding dyestuff compositions.

The addition products to be used in accordance with the invention which correspond to the formula (I) have partly been known. Those compounds which have not yet been described may be obtained by reacting the modified natural rosin acids, or the esterification products having been prepared thereof with polyols, with ethylene oxide and/or propylene oxide to give the corresponding alkylene oxide addition products.

As starting compounds there are suitable rosin-phenol compounds, as they are obtained by the addition of phenol, cresol, o-cresol acetate, salicyclic acid, guaiacol, diphenols, polyphenols as well as α- or β-naphthol to natural rosin acids, such as abietic acid, dehydroabietic acid, dihydroabietic acid, tetrahydroabietic acid, levopimaric acid, dextropimaric acid and isodextropimaric acid, as they are present in commercial types of colophony, and to disproportionated, hydrogenated, dehydrogenated and dimerized rosin acids in the presence of strongly acid catalysts or catalysts capable of splitting off acid, such as boron trifluoride, hydrogen chloride, tin tetrachloride, aluminum chloride or strong mineral acids, at a temperature of from 20° to 120° C. in an organic medium, wherein there is reacted per mol of rosin acid suitably from 0.5 to 0.8, preferably 0.7, mol of the above-specified phenols or naphthols.

As further starting compounds there are suitable modified natural rosin acids, as they are obtained by a reaction of natural rosin acids with aryl, aralkyl or cycloalkyl compounds capable of splitting off halogen, for example, benzyl chloride, bis-chloromethylbenzene, chloromethyl toluene, benzal chloride, 4-chlorobenzyl alcohol, 4-chloro-diphenyl, 4-chloro-diphenyl ether, 4-chloromethyl-diphenyl ether, 1-chloronaphthalene, 2-chloronaphthalene, 1-(chloromethyl)-naphthalene, 4-chloro-1-naphthol or cyclohexyl chloride in the presence of a catalyst, such as zinc chloride, at a temperature of from 100° to 200° C., preferably from 150° to 210° C., in which process there is reacted per mol of rosin acid suitably from 0.5 to 1.0, preferably from 0.7 to 0.8 mol of the abovementioned halogen compounds. Suitable starting materials are in addition maleinate rosins, whose anhydride groups have been esterified, for example, with glycol, diglycol, glycerol, 1,1,1-trimethylol propane, pentaerythritol or monohydric alcohols.

As representatives of the polyols for the esterification of natural and modified rosin acids there may be mentioned, for example: glycol, glycerol, 1,2,4-butane triol, butane diol-(1,4), 1,1,1-trimethylol propane, pentaerythritol, 2,4-dihydroxy-3-methylol pentane, hexane triol, sorbitol, anhydrosorbitol, hexitol and mannitol. The esterification of the modified rosin acids with the polyols is effected in a molar ratio of from 1:1 to 4:1, preferably 1:1 to 2:1, in accordance with known esterification processes at a temperature of from 180° to 300° C., preferably from 200° to 270° C., optionally while adding an entrainer, such as an aromatic hydrocarbon or chlorinated hydrocarbon. As catalysts there may be used, for example, benzene-sulfonic acid, p-toluene-sulfonic acid, boric acid, powdered tin or sulfuric acid.

The reaction with alkylene oxides, such as 1,2-propylene oxide or preferably ethylene oxide, is carried out according to known methods, preferably with alkali metal hydroxides or alkoxides as catalysts at 100° to 200° C., preferably at 140° to 180° C. The amount of ethylene oxide and/or propylene oxide is proportioned in a way that a good water-solubility of the addition products is achieved. There are advantageously added from 8 to 100, preferably from 25 to 75 mols, of ethylene oxide and/or propylene oxide to each free carboxy and hydroxy group, depending on the intended hydrophilic properties.

As alkali metal hydroxide there is suitable potassium hydroxide or preferably sodium hydroxide, and as alkali metal alkoxide there may be mentioned sodium methylate or ethylate, the concentration preferably being in the range of from 0.05 to 1.0% by weight, calculated on the modified rosin acids or the esterification products and maleinate rosins made thereof, at the beginning of the oxalkylation. The oxalkylation may be carried out without pressure or in pressure vessels with propylene oxide or preferably ethylene oxide, or mixtures of the two substances, the ethylene oxide being either fed in in a gaseous or liquid state. If pressure is applied for the operation, it is in the range of from 1 to 10, preferably from 2 to 8 bars.

These addition products of the formula (I) represent preparation agents for dyestuffs and permit the production of highly concentrated dyestuff preparations with a low content of dispersing agent, which preparations are distinguished by a great number of favorable properties.

In this context, the term "dyestuffs" comprises those dyestuffs as well as optical brighteners that are sparingly soluble in water, especially disperse dyestuffs.

The preparations of disperse dyestuffs known so far show a series of disadvantages, which the preparations of the invention do not exhibit. Thus, conventional preparations of disperse dyestuffs containing a high proportion of anionic dispersing agent (0.5 part or more in liquid formulations and 1.0 part or more in powder formulations per part of disperse dyestuff) cause an undesirable reduction in viscosity when stirring printing pastes together with synthetic thickening agents. Normally, the viscosity of the preparation rises with an increasing content of dispersing agent in the grinding or kneading paste to such a degree that under unfavorable circumstances—above all at slightly elevated temperatures—the formulations become viscous or even solid. On the other hand, the proportion of anionic dispersing agent cannot be reduced to any desired extent, since otherwise the dispersions obtained are not stable or show an insufficiently fine division from the start.

For reasons of rationalization, attempts are made in the dye houses to reduce the goods-to-liquor ratios of the dye baths as far as possible, for which purpose preference is given to dyestuff formulations with a dyestuff concentration as high as possible. The high proportion of anionic dispersing agent in conventional disperse dyestuff preparations may lead to an undesirable foam formation in modern dyeing processes, such as jet dyeing. A strong dyestuff retention, especially in the case of pad dyeings, is also frequently considered a drawback. In the printing shops, the high proportion of dispersing agent in common disperse dyestuff preparations involves, besides the abovementioned adverse effect on the viscosity of the printing pastes, also an expensive subsequent washing of the prints.

The present invention permits to produce disperse dyestuff preparations which are not subject to the above restrictions and which are especially suitable for a series of special tasks. Thus, aqueous dispersions obtained according to the invention may be dried to powders without any loss in quality. The powders as well as the liquid formulations are excellently suitable for the dyeing and printing of various materials.

In the following, further preferred embodiments of the invention are illustrated in detail.

Preference is given to those addition products of the formula (I), in which A stands for a modified natural rosin acid which is obtained by disproportionation or by a reaction of aromatic hydroxy compounds or of aryl, aralkyl or cycloalkyl compounds capable of splitting off halogen with commercial types of colophony, or for an esterification product of 1 to 4, preferably 1 to 2, mols of natural or modified natural rosin acids with 1 mol of a dihydric to hexahydric alcohol, and n stands for an integer of from 25 to 75.

Preferred preparations contain from 5 to 90, especially from 30 to 90, % by weight of dyestuff, from 2 to 40, especially from 2 to 20, % by weight of one or several addition products (I), up to 20, in particular up to 10, % by weight of anionic dispersing agents and up to 70% by weight of water and/or water retention agents. Besides, the preparations of the invention may also contain other non-ionogenic surfactants and additives that are common in such preparations, for example, hygroscopic agents, foam inhibitors, dust preventing agents or preservatives.

Particularly preferred highly concentrated preparations of low dispersing agent content contain from 30 to 90% by weight of dyestuff and from 3 to 20% by weight of addition product (I). If the preparations contain also the above-specified or other common additives, said additives may be introduced before, during or after the dispersing of the dyestuffs.

If the preparations of the invention contain anionic dispersing agents, those commonly employed for this purpose are used. Preference is given to condensation products of aromatic sulfonic acids and formaldehyde, especially condensation products of alkyl-naphthalene-sulfonic acids, above all methyl-naphthalene-sulfonic acids and formaldehyde, as they are known from German Pat. No. 2,442,514. There are also suitable condensation products of an optionally substituted phenol with formaldehyde and alkali metal salts of lignin-sulfonic acids.

As compared with common disperse dyestuff preparations, the preparations of the invention are marked by a considerably lower content of surface-active substances. The water-soluble addition products (I) to be used in accordance with the invention are in addition marked by a very good biodegradability, so that the charge of the waste water is only at a minimum.

In spite of the limited use of surface-active substances there are obtained preparations of the invention which even with a very high content of dyestuff show good flowing properties and a good stability to storage.

Owing to their good compatibility with synthetic thickeners, the preparations may be employed in printing inks for roller printing with very "shallow" engravings, which leads to full prints. Their use in rotary film printing is also possible.

The preparations of the invention may be obtained in accordance with all known processes. In order to obtain preparations of disperse dyestuffs, the disperse dyestuff or a mixture of disperse dyestuffs is mixed with one or several of the above-mentioned addition products (I), optionally with an anionic dispersing agent and optionally with other additives, or is subjected to mechanical comminution. The order of addition of the components may also be varied. The mechanical comminution is carried out preferably by way of kneaders, ball mills, dispersing devices, bead mills, sand mills or attrition mills. The point at which the desired fine division with a particle size of generally about 3 $\mu$m, preferably 1 $\mu$m, has been reached may be determined by means of a filter test or with the aid of a microscope. The preparations thus obtained contain the disperse dyestuffs in a stable finely divided form.

Said fine division is maintained also after several weeks of storage both at room temperature and at 50° C. and is not impaired by the exposure to low temperatures.

In order to yield a pulverulent preparation, aqueous preparations may be dried in common manner, for example by spray drying. The pulverulent preparations thus obtained are easily redispersed by simply stirring them into water or into solutions of binding agents.

Owing to the low content of surface-active substances, there is no retarding effect when using the dye preparations of the invention in dye baths or printing pastes, and brilliant shades are obtained. Besides, in the case of direct printing, the subsequent washing required may be reduced considerably or may even be eliminated when using thickeners having a low content of solids, without any marked impairment of the feel of the printed goods or of the brilliancy and shade. In this case the preparations are advantageously adjusted to a pH of from about 6 to 8.

According to a particularly preferred embodiment of the invention, use is made of disperse dyestuffs which are capable of subliming without decomposition at atmospheric pressure and a temperature of from 150° to 220° C. to at least 60%, especially disperse dyestuff from the series of mono- or disazo, anthraquinone, quinophthalone, nitro, azomethine, napthalene-tetracarboxylic acid or benzoxanthene dyestuff, or mixtures of such dyestuffs. The preparations thus obtained are suitable for the production of printing inks for the printing of transfer papers for thermo printing.

The following Examples illustrate the invention, the percentages and parts relating to the weight, unless otherwise stated.

EXAMPLE 1

400 Parts of the dry dyestuff of the formula (1)

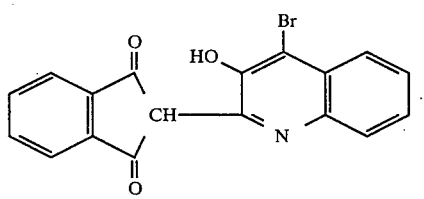

are ground, while cooling, in a solution of 40 parts of the reaction product of the glycerol monoester of disproportionated abietic acid with 75 mols of ethylene oxide (termed "non-ionogenic dispersing agent II" in the following), 20 parts of a condensation product of methyl-naphthalene-sulfonic acid and formaldehyde, as it has been described in Example D of German Pat. No. 2,442,514 (hereinafter termed "anionic dispersing agent A"), 100 parts of ethylene-glycol, 300 parts of water and 2 parts of chloroacetamide as preservative, in a bead mill with siliquartzite beads (diameter 1 mm). After a grinding period of 3 hours there is obtained a dispersion over 90% of whose particles are smaller than 3 μm. The grinding paste is made up to 100 parts with water and is filtered off from the beads. A free-flowing preparation is obtained which is stable to storage both at room temperature and at 50° C. for several weeks and which is also insensitive to the action of low temperatures.

EXAMPLE 2

350 Parts of the dyestuff of the formula (2)

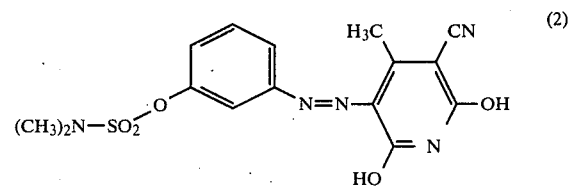

are ground for 3 hours, while cooling, in a bead mill with siliquartzite beads (diameter 1 mm) in a solution of 100 parts of the reaction product of colophony glycerol ester with 75 mols of ethylene oxide (hereinafter termed "non-ionogenic dispersing agent III") in 300 parts of water and 150 parts of ethylene-glycol. After this period there is obtained a free-flowing dispersion to more than 90% whose particles are smaller than 3 μm. The liquid paste is made up to 1000 parts with 4 parts of the sodium salt of pentachlorophenol and water and is filtered off from the beads. The preparation shows favorable flow properties, is stable to storage for a prolonged period of time both at room temperature and at 50° C. and is also insensitive to the action of low temperatures.

EXAMPLE 3

400 Parts of the dyestuff of the formula (3)

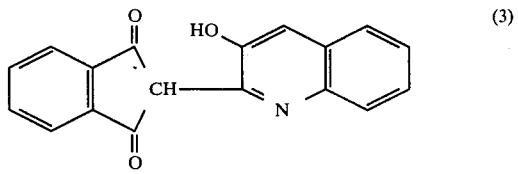

are ground for 4 hours, while cooling, in a bead mill with siliquartzite beads (diameter 1 mm) in a solution of 40 parts of non-ionogenic dispersing agent III and 20 parts of anionic dispersing agent A in 300 parts of water and 100 parts of ethylene-glycol. After this time there is obtained a free-flowing dispersion over 90% whose particles are smaller than 3 μm. The liquid paste is made up to 1000 parts, while adding 5 parts of zinc-sodium-N,N-dimethyl-dithiocarbaminate with water, and is filtered off from the beads. The preparation shows favorable flow properties, is stable to storage for a prolonged period of time both at room temperature and at 50° C. and is also insensitive to the action of low temperatures.

If the dyestuffs, dispersing agents and other components indicated in the following Table 1 are used instead of the components mentioned in Example 3 and the process is otherwise carried out as has been described in Example 3, there are also obtained free-flowing aqueous pastes which are stable to storage.

TABLE 1

| | (Values calculated on 1000 parts of preparation) | | | | | | | | |
|---|---|---|---|---|---|---|---|---|---|
| | dyestuff | | non-ionic dispersing agent | | anionic dispersing agent | | ethylene-glycol | preservative | | grinding period |
| Example | parts | No. | parts | No. | parts | type | parts | parts | type | (hours) |
| 4 | 350 | 4 | 90 | IV | 10 | A | 150 | 4 | M | 4 |
| 5 | 400 | 1 | 40 | V | 20 | A | 100 | 5 | P | 3 |
| 6 | 400 | 5 | 16 | IV | 20 | A | 100 | 4 | P | 4 |
| 7 | 400 | 6 | 26 | VI | 7 | D | 200 | 4 | P | 4 |
| 8 | 400 | 6 | 40 | II | 13 | B | 200 | 4 | M | 4 |
| 9 | 400 | 6 | 40 | VII | 13 | B | 200 | 4 | M | 4 |
| 10 | 400 | 6 | 40 | VIII | 13 | B | 200 | 4 | M | 4 |
| 11 | 400 | 6 | 40 | IX | 13 | B | 200 | 4 | M | 4 |

TABLE 1-continued

| | | | (Values calculated on 1000 parts of preparation) | | | | | | |
|---|---|---|---|---|---|---|---|---|---|
| | dyestuff | | non-ionic dispersing agent | | anionic | | ethylene-glycol | pre-servative | | grinding period |
| Example | parts | No. | parts | No. | parts | type | parts | parts | type | (hours) |
| 12 | 300 | 7 | 90 | II | 15 | A | — | 5 | P | 4 |
| 13 | 300 | 8 | 60 | II | 12 | A | — | 4 | G | 3 |
| 14 | 300 | 8 | 75 | X | 15 | A | — | 4 | G | 4 |
| 15 | 400 | 1 | 50 | XI | 20 | A | 100 | 3 | C | 3 |
| 16 | 400 | 6 | 50 | XI | 15 | B | 200 | 4 | M | 4 |

Comments on Table 1:
(a) Dyestuffs 4 through 8 have the following formulae:

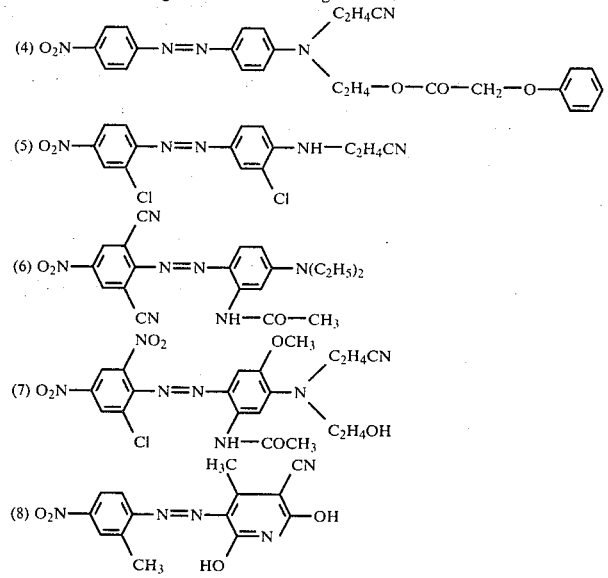

(b) The non-ionogenic dispersing agents IV through XI have the following compositions:
IV: Glycerol monoester of disproportionated abietic acid reacted with 50 mols of ethylene oxide
V: Hydroabietyl alcohol reacted with 50 mols of ethylene oxide
VI: Reaction product of the glycerol monoester of disproportionated abietic acid with 34 mols of ethylene oxide
VII: Reaction product of hydroxyphenyl colophony (obtained from phenol and colophony) with 50 mols of ethylene oxide
VIII: Reaction product of 2-hydroxynaphthyl colophony (obtained from β-naphthol and colophony) with 50 mols of ethylene oxide
IX: Reaction product of hydroxy-carboxy-phenyl colophony (obtained from salicylic acid and colophony) with 25 mols of ethylene oxide
X: Reaction product of the glycerol monoester of benzyl colophony (obtained from benzyl chloride and colophony) with 34 mols of ethylene oxide
XI: Reaction product of colophony maleinate rosin with 75 mols of ethylene oxide
(c) The anionic dispersing agents B through D are characterized as follows:
B: Condensation product of cresol, formaldehyde and sodium sulfite, neutralized (German Patent No. 2,032,926)
C: Condensation product of cresol, Schaeffer's salt (sodium salt of 2-hydroxy-6-sulfo-naphthalene), formaldehyde and sodium sulfite
D: Lignin sulfonate
(d) Preservatives
C = Chloroacetamide
G = 2,4-dimethyl-6-acetoxy-(1,3)-dioxan
M = Zn, Na—N,N'-dimethyl dithiocarbaminate
P = sodium salt of pentachlorophenol

Example 17

494 Parts of a moist filter cake of the dyestuff of the formula (6) with a solids content of 81% are ground in a bead mill, after having been stirred into a paste with a solution of 50 parts of the non-ionogenic dispersing agent II in 300 parts of water. After a grinding period of 3 hours, 25 parts of anionic dispersing agent A are added, and grinding is continued for another hour. Subsequently, 92.5 parts of the anionic dispersing agent B are added to the grinding paste, which is then spray-dried at an input temperature of from 160° to 180° C. and an output temperature of from 70° to 80° C. There is obtained a low-dust free-flowing powder with a solids content of 71%, which is easily dispersed when being stirred into a stock thickener, an aqueous dye bath or an aqueous padding liquor.

EXAMPLE 18

If 55 parts of the anionic dispersing agent C are used instead of the anionic dispersing agent B and the process is otherwise carried out as has been described in Example 17, a powder of a dyestuff content of 75.5% is obtained which also shows the favorable properties mentioned in Example 17.

What is claimed is:
1. A dyestuff preparation, comprising a water-insoluble dyestuff and water-soluble oxalkylate of the formula

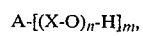

wherein
A is selected from the group consisting of radicals of
(a) modified natural rosin acids, each of which is obtained by disproportionation, dimerization, hydrogenation or dehydrogenation of a natural rosin acid or by reaction of colophony with an aromatic hydroxy compound, or aryl, aralkyl or cycloalkyl compound capable of splitting off halogen, (b) esterification products of natural rosin acids, and esterification products of modified natural rosin acids as defined in (a), each obtained by esterifying 1 to 4 mols of such natural rosin acid or modified natural rosin acid with 1 mol of a di-, tri-, tetra-, penta- or hexahydric alcohol, and mixtures of said esterification products, and (c) maleinate rosins obtained from colophony by reaction with maleic anhydride and subsequent esterification of the anhydride group;

X stands for a group or groups, either identical or different, of the formulae —CH$_2$—CH$_2$— and —CH$_2$—CH(CH$_3$)—;

n stands for a number of from 8 to 100; and m stands for a number of from 1 to 5.--;

2. A preparation as claimed in claim 1, wherein the dyestuff is a disperse dyestuff.

3. A preparation as claimed in claim 1, wherein the dyestuff is capable of subliming without decomposition at 150° to 220° C. at atmospheric pressure to at least 60% by weight.

4. A preparation as claimed in claim 1, wherein A is a defined in (a).

5. A preparation as claimed in claim 1, wherein A is as defined in (b).

6. A preparation as claimed in claim 5, wherein the alcohol is a low-molecular alkanol.

7. A preparation as claimed in claim 5, wherein the esterification product is obtained with 1 to 2 mols of said alcohol.

8. A preparation as claimed in claim 1, wherein X is ethylene.

9. A preparation as claimed in claim 1, wherein n is 25 to 75.

10. A preparation as claimed in claim 1, containing 5 to 90% by weight of said dyestuff, 2 to 4% by weight of said oxalkylate, 0 to 20% by weight of an anionic dispersant and 0 to 70% by weight of water and/or adjuvants.

11. A preparation as claimed in claim 1, containing 30 to 90% by weight of said dyestuff, 2 to 20% by weight of oxalkylate, 0 to 10% by weight of an anionic dispersant and 0 to 70% by weight of water and/or adjuvants.

12. A preparation as claimed in claim 1, containing 30 to 90% by weight of said dyestuff, 3 to 20% by weight of said oxalkylate and 0 to 70% by weight of water and/or adjuvants.

13. A process for dyeing or printing fiber materials consisting of, or containing, synthetic fibers which comprises contacting said materials with dye liquors or printing pastes containing a preparation as claimed in claim 1.

14. A process as claimed in claim 13, wherein the synthetic fiber is a polyester fiber.

15. A process as claimed in claim 13, wherein the synthetic fiber is polyethyleneglycol terephthalate.

* * * * *